United States Patent Office 2,822,397
Patented Feb. 4, 1958

2,822,397

CATALYTIC HYDROGENATION OF AROMATIC NITRO COMPOUNDS TO AMINES

Leon O. Winstrom, East Aurora, N. Y., assignor to Allied Chemical & Dye Corporation, New York, N. Y., a corporation of New York No Drawing. Application August 18, 1955
Serial No. 529,310

8 Claims. (Cl. 260—580)

This invention relates to the hydrogenation of aromatic nitro compounds to the corresponding amines, and is particularly concerned with an improved process for the catalytic vapor phase hydrogenation of nitrobenzene to aniline and an improved catalyst for said process.

The prior art discloses the hydrogenation of nitrobenzene vapors to aniline in the presence of catalysts comprising nickel sulfide supported on inactive alumina, e. g. corundum and "Alundum." However, our experience indicates that such catalysts have comparatively low activity and are generally inadequate for commercial use in the hydrogenation of aromatic nitro compounds to the corresponding amines. The art further discloses hydrogenation of nitrobenzene to aniline in the presence of a catalyst consisting of a mixture of metallic sulfides, such as nickel sulfide and tungsten sulfide, supported on activated alumina, and the vapor phase hydrogenation of nitrobenzene to aniline over a catalyst consisting of copper sulfide supported on an inert carrier including activated alumina. However, in commercial practice as heretofore carried out, aniline is commonly prepared from nitrobenzene using acid and iron as reducing medium.

One object of the invention is to provide an improved catalytic process for hydrogenating aromatic nitro compounds, particularly nitrobenzene, to the corresponding aromatic amines. Another object of the invention is to provide an improved catalyst for said process. Particular objects of the invention are the provision of an improved catalyst and an improved catalytic procedure for hydrogenating nitrobenzene in the vapor phase to aniline more rapidly and with better yields than the prior art. Other objects in part will be obvious and in part will appear hereinafter.

To accomplish the foregoing objects and in a broad sense, the invention briefly resides in carrying out the reduction of an aromatic nitro compound, such as nitrobenzene, to the corresponding amine by hydrogenating the aromatic nitro compound in the presence of nickel sulfide associated with amorphous alumina as hereinafter described. The nickel sulfide-amorphous alumina catalysts of the invention greatly increase the rate of reaction and yield of aromatic amine product over that obtained utilizing the ordinary nickel sulfide-alumina catalysts heretofore proposed for this reaction, particularly as regards production of aniline from nitrobenzene. Thus, my catalysts may be at least 10 times as effective as prior art catalysts, particularly those made with inactive alumina, which have been proposed for aiding the hydrogenation of aromatic nitro compounds such as nitrobenzene to the corresponding amines. It was indeed surprising and unobvious that the nickel sulfide-amorphous alumina catalysts of the invention would function with such an outstanding degree of efficiency in the reduction reaction.

While the process of the invention is applicable for effecting the vapor phase and even liquid phase reduction of aromatic nitro compounds such as nitrotoluenes, nitroxylenes, etc., to the corresponding amines with hydrogen, the herein disclosed process is of particular advantage in effecting the vapor phase reduction (hydrogenation) of nitrobenzene to aniline. The invention process will accordingly be described especially in relation to the latter reaction, although it is to be understood it is not limited thereto.

The amorphous alumina which is mixed with the nickel sulfide constitutes an essential element of the catalyst compositions of the invention. Such amorphous alumina does not function merely as a carrier or inert material in the catalyst composition, but acts as a promoter for the nickel sulfide. Hence, the combination of the nickel sulfide and amorphous alumina in my catalyst compositions and employed in my process, acts synergistically to facilitate the aforementioned reaction to a degree far above the additive individual effects of the nickel sulfide and the amorphous alumina on the reaction.

Catalysts of the present invention, so-called "coignited" type catalysts comprising amorphous alumina in combination with nickel sulfide, may be prepared in various ways, a number of which are suitable. Thus, they can be obtained by igniting a mixture of nickel and aluminum salts to form a mixture of nickel and aluminum oxides, and then sulfiding the mixture of oxides, with or without an intermediate reduction in known manner of the nickel oxide to metallic nickel.

Thus, the catalysts of the present invention may be obtained by heating mixtures of salts of nickel and aluminum (e. g., the nitrates, formates, acetates and/or oxalates), preferably on a carrier (e. g., activated alumina, charcoal, "Alundum," etc.), in the presence or absence of air to produce a mixture of nickel and aluminum oxides, and treating the oxides mixture with a suitable sulfiding agent (e. g., $H_2S$ or $CS_2$) to form an alumina-promoted nickel sulfide catalyst comprising an intimate mixture of nickel sulfide and amorphous alumina. The heating (igniting) and sulfiding operations may be conducted simultaneously, if desired; and, prior to the sulfiding step, the oxides may be reduced with hydrogen in known manner to convert the nickel oxide to metallic nickel, which then can be sulfided. The heating, sulfiding, etc., operations are generally conducted at a temperature not above 800° C., and preferably not above about 500° C.

The alumina is apparently present in the "coignited" catalysts essentially entirely in amorphous form. On the other hand, ordinary aluminas are of essentially crystalline structure and do not possess the physical characteristics and catalytic activity of the amorphous alumina of the invention catalysts. The expression "amorphous alumina" as employed herein is intended to denote alumina which is substantially completely in amorphous form.

Further, the nickel sulfide-amorphous alumina catalysts of the present invention are believed to contain the sulfur and nickel mainly in the form of a mixture of sulfides and apparently do not lose substantial amounts of sulfur during use and/or reactivation, whereas the prior art catalysts employed in hydrogenating nitrobenzene to aniline, obtained by sulfiding nickel oxide supported on inactive alumina in the form of corundum or "Alundum" and apparently containing only one nickel sulfide (i. e. NiS), tend to lose all of their sulfur content and are markedly less active than the catalysts of the invention.

It is accordingly believed that the relatively high activity of the nickel sulfide-amorphous alumina catalysts of the invention when employed for the reduction of nitro aromatics to the corresponding amines (e. g. aniline) by hydrogenation is due to their content of amorphous alumina and/or multiple nickel sulfides, wherein the nickel is present in various valences. However, the invention is not to be taken as limited by any theory as to the reason for, or the manner in which, the catalysts hereof successfully function.

The amorphous alumina is effective, in amounts varying over a wide range, as promoter for the nickel sulfide in the reduction of nitrobenzene to aniline by catalytic hydrogenation in accordance with the invention. Thus, this promoting action may be realized even if such alumina is present in amount as low as 2% by weight of the catalyst mixture of alumina and nickel sulfide. However, it is preferable to employ the alumina promoters of the invention in an amount of at least 10% by weight of the nickel sulfide-amorphous alumina catalyst; and for best results, from about 10% to about 90% of the alumina by weight of the catalyst composition should be present. An especially valuable catalyst contains nickel and aluminum in substantially equimolar amounts (atomic proportions).

The reduction of nitrobenzene vapors to aniline by hydrogenation with the aid of the catalysts of the invention may be carried out at varying temperatures, but is preferably effected at temperatures between 250° and 350° C. It should be recognized, however, that the temperature throughout a bed of catalyst during the hydrogenation reaction may vary, and in normal operation of the invention process peak temperatures (i. e. the temperature of zone of maximum reaction) within such a catalyst bed may be as high as 400°–450° C.

The nitrobenzene vapors are generally mixed with hydrogen or a mixture which contains hydrogen and a substantially inert gas (for example, crude hydrogen which contains substantial amounts of carbon monoxide and is obtainable from cracking hydrocarbons). Preferably the hydrogen is employed in amounts of about 1½ to 5 times the amount theoretically required for the reduction, corresponding to about 4½ to 15 mols of hydrogen per mol of nitrobenzene.

The nickel sulfide-amorphous alumina catalysts of the invention require no addition of $H_2S$ or other sulfiding agent during the hydrogenation of nitrobenzene to aniline in accordance with the invention to maintain their activity, and are generally characterized by high activity and long life when used in this reaction. Further, their activity, when lost, may be restored substantially completely and repeatedly by removing accumulated organic material therefrom by oxidation with oxygen or air, preferably at between 300° and 500° C., followed by reduction with hydrogen, preferably within the same temperature range, as described and claimed in U. S. Patent 2,671,763 to L. O. Winstrom and W. B. Harris.

The invention will be illustrated by the following specific examples, but it is to be understood that it is not limited to the details thereof and that changes may be made without departing from the scope of the invention. The temperatures are in degrees centigrade and the parts are by weight.

EXAMPLE 1

Three catalysts were prepared as follows:

(1) A mixture of 378 parts of crystallized nickel nitrate, $Ni(NO_3)_2 \cdot 6H_2O$, 122 parts of aluminum nitrate $Al(NO_3)_3 \cdot 9H_2O$, and 300 parts of "Alundum" of 6 to 10 mesh size was heated to 90° for one hour, during which the nickel and aluminum nitrates melted and dissolved in their water of crystallization. Thereafter, to promote impregnation, the mixture was submitted for about 1 to 2 minutes to a reduced pressure of 1 cm. mercury absolute, and then returned to atmospheric pressure. This subjection to alternate reduced and atmospheric pressures was repeated once. The mixture was then placed in a rotating coater device and heated to about 200°. The "green" catalyst thus obtained was then successively heated in a stream of air up to about 300° in one hour, then to 450° in about 2 hours, and kept at 450° for one hour to convert the nickel and aluminum nitrates to their oxides. The catalyst was then cooled to room temperature and was sulfided by heating in a stream of hydrogen sulfide in about 2 hours to 350°, followed by holding the resulting material at 350° for 1 hour, and cooling to room temperature. The catalyst product was stored in an oxygen-free atmosphere of carbon-dioxide prior to use.

(2) Another catalyst was prepared in the same manner as (1) except 290 parts of the nickel nitrate and 8 parts of the aluminum nitrate were employed.

(3) A control catalyst was made in the same manner as (1) except that 290 parts of the nickel nitrate were employed and the aluminum nitrate was entirely omitted.

Each of the three catalysts thus obtained was placed in a Downs type converter (see for example U. S. P. 1,604,739), and nitrobenzene was hydrogenated therein under the following conditions, except that when using the control catalyst containing no aluminum nitrate, catalyst (3), the nitrobenzene feed rate was halved in order to double the average reaction time (contact time) in an effort to produce a larger amount of aniline than at the greater feed rate used with the other two catalysts. Technical nitrobenzene vapors mixed with about 9 molecular proportions of hydrogen (i. e. about 3 times the amount of hydrogen theoretically required to reduce the nitrobenzene to aniline) were passed over the catalyst at an hourly rate of about 300 grams of nitrobenzene per liter of catalyst while the bath temperature was maintained at about 300°. The gaseous reaction products from the converter were passed through a water-cooled condenser, from which aniline and water condensate flowed to a receiver. The crude aniline thus obtained was separated from the water layer, dehydrated by atmospheric distillation of water therefrom, and then distilled at a pressure of 5 cm. mercury absolute. The yields of crude aniline thus obtained are set out in the table below.

Table

| Catalysts: | Yield of aniline (percent theory) |
|---|---|
| (1) | 99.5 |
| (2) | 33 |
| (3) Control | 16 |

From the above table, it is particularly noted that employment of the "coignited" nickel sulfide-amorphous alumina catalyst of the invention containing a substantial amount of amorphous alumina, catalyst (1), in the hydrogenation of nitrobenzene, resulted in a practically theoretical yield of aniline (99.5%), whereas utilization of a catalyst containing only ordinary alumina, catalyst (3), produced an aniline yield of only 16% even though the nitrobenzene feed rate was halved.

EXAMPLE 2

582 parts of nickel nitrate, $Ni(NO_3)_2 \cdot 6H_2O$, and 750 parts of aluminum nitrate, $Al(NO_3)_3 \cdot 9H_2O$ (equimolar amounts) are fused together with agitation in a rotary coating apparatus of the type employed in Example 1. The resulting melt is then dehydrated by heating in the air at 100–115°, the solid mass resulting from the dehydration is broken into lumps and calcined (ignited) at 400° to 425° in an atmosphere of carbon dioxide, and the calcined material is then ground until 100% passes thru a 20 mesh screen. The powder thus obtained is mixed with 5% by weight of colloidal graphite as a mold lubricant and the mixture is compressed into cylinders about ⅛" x ⅛" having convex ends. The pellets thus obtained are charged to a Downs type converter and heated to about 400°, while passing a stream of hydrogen therethrough until reduction of the nickel oxide is complete, as indicated by the end of evolution of water. The pellets are then cooled to about 300° while continuing the passage of hydrogen and then sulfided by introducing hydrogen sulfide together with the hydrogen at 300°, during which the temperature "peak," which passes through the catalyst bed in the direction of the gas flow, is not allowed to exceed about 350° by controlling the amount of hydrogen sulfide introduced. After the temperature peak has completely traversed the catalyst bed, the latter is heated to 375° in the hydrogen-hydrogen sulfide stream. The hydrogen sulfide feed is then stopped and the catalyst is cooled to 300° in the stream of hydrogen.

Technical nitrobenzene vapors and about 3 times the amount of hydrogen required by theory to form aniline are then passed through the catalyst bed while maintaining the bath temperature at 300° and at an hourly rate of about 300 grams of nitrobenzene per liter of catalyst. The yield of aniline thus obtained is substantially quantitative.

The nickel sulfide-amorphous alumina catalysts employed in the invention process may be utilized in admixture with other suitable materials which may be catalytic or non-catalytic under the reaction conditions. Thus, the catalyst compositions of the invention, in the form of pellets, granules or other shapes, may contain binders, stabilizers, activators, or other components. Further, such catalyst compositions may be used on supporting material or carriers such as silica or various clays, particularly where the amorphous alumina of the invention catalysts does not function itself as a carrier. Thus, for example, a suitable "coignited" catalyst may be prepared by igniting a mixture of nickel and aluminum salts by itself, or in or on a suitable carrier, e. g. activated alumina, corundum, charcoal, etc., followed by sulfiding the mass as described above. In use, the catalyst compositions of the invention may be employed in the form of fixed catalyst beds or fluidized catalyst masses in a manner known in the art.

The nickel sulfide-amorphous alumina catalysts described above may contain small amounts of other metal sulfides in addition to nickel sulfide, e. g. copper sulfide, without deleteriously affecting the life or activity of such catalysts in operation.

The catalysts used in accordance with the invention are more or less pyrophoric, and are hence desirably kept and stored in a non-oxidizing atmospheric or medium (e. g., $CO_2$, $H_2$, $N_2$, $H_2S$) or under liquid aniline saturated with $H_2S$ or water saturated with $H_2S$.

From all of the foregoing, it is apparent that the nickel sulfide-amorphous alumina catalysts of the invention are much more powerful stimulants for the vapor phase hydrogenation of nitrobenzene to aniline than catalysts prepared by combining nickel sulfide with inactive alumina, e. g., corundum or "Alundum." The major advantages of the invention process for hydrogenating aromatic nitro compounds, particularly nitrobenzene to aniline are (a) great increase in rate of reaction; (b) ability to carry out the reaction more vigorously at a given temperature than heretofore possible by prior art procedures; (c) increase in yield of product; (d) longer catalyst life; and (e) ease of regeneration of the catalyst and ability to regenerate it repeatedly without discarding it, advantages (d) and (e) thus affording economies in catalyst cost and maintenance.

Since various changes and modifications may be made in the invention without departing from the spirit thereof, the invention is to be taken as limited only by the scope of the appended claims.

This application is a continuation-in-part of my U. S. application Serial No. 203,561, filed December 29, 1950 (now U. S. Patent 2,716,135).

I claim:

1. A catalyst suitable for effecting catalytic hydrogenation reactions, comprising essentially an intimate mixture of nickel sulfide and amorphous alumina, the amount of amorphous alumina being about 10% to about 90% of the weight of the catalyst, said catalyst having been obtained, by a procedure including a sulfiding treatment, from a mixture of oxides of nickel and aluminum which has been produced by igniting a mixture of nickel and aluminum salts.

2. A catalyst as claimed in claim 1, in which nickel and aluminum are present in substantially equal atomic proportions.

3. A catalyst suitable for effecting catalytic hydrogenation reactions, comprising essentially an intimate mixture of nickel sulfide and amorphous alumina, the amount of amorphous alumina being about 10% to about 90% of the weight of the catalyst, said catalyst having been obtained, by a procedure including a sulfiding treatment, from a mixture of oxides of nickel and aluminum which has been produced by heating a mixture of nickel and aluminum salts at a temperature of 300° to 800° C.

4. A catalyst as claimed in claim 1, in which the mixture of oxides of nickel and aluminum has been produced by heating a mixture of nickel and aluminum nitrates at a temperature not exceeding 500° C.

5. In the process of manufacturing a mononuclear aromatic primary amine by the vapor-phase catalytic reduction of the corresponding mononuclear aromatic nitro hydrocarbon with hydrogen, the improvement which comprises contacting a mixture of vapor of said mononuclear aromatic nitro hydrocarbon and at least 4½ mols of hydrogen per mol of nitro hydrocarbon, at a temperature of 250° to 450° C., with a catalyst essentially comprising an intimate mixture of nickel sulfide and amorphous alumina, the amount of amorphous alumina being about 10% to about 90% of the weight of the catalyst, said catalyst having been obtained, by a procedure including a sulfiding treatment, from a mixture of oxides of nickel and aluminum which has been produced by igniting a mixture of nickel and aluminum salts.

6. The process of manufacturing aniline by the vapor-phase catalytic reduction of nitrobenzene with hydrogen, which comprises passing a mixture of nitrobenzene vapor and at least 4½ mols of hydrogen per mol of nitrobenzene, at a temperature of 250° to 450° C., in contact with a catalyst essentially comprising an intimate mixture of nickel sulfide and amorphous alumina, the amount of amorphous alumina being about 10% to about 90% of the weight of the catalyst, said catalyst having been obtained, by a procedure including a sulfiding treatment, from a mixture of oxides of nickel and aluminum which has been produced by heating a mixture of nickel and aluminum salts to a temperature of 300° to 800° C.

7. The process of manufacturing aniline claimed in claim 6, wherein the catalyst has been obtained from a mixture of oxides of nickel and aluminum which has been produced by heating a mixture of nickel and aluminum salts to a temperature not exceeding 500° C.

8. The process of manufacturing aniline claimed in claim 7, in which nickel and aluminum are present in the catalyst in substantially equal atomic proportions.

References Cited in the file of this patent

UNITED STATES PATENTS

| | | |
|---|---|---|
| 1,662,421 | Herold et al. | Mar. 13, 1928 |
| 2,039,259 | Pier et al. | Apr. 28, 1936 |
| 2,402,439 | Owen | June 18, 1946 |
| 2,402,440 | Owen | June 18, 1946 |
| 2,402,626 | Hawk | June 25, 1946 |
| 2,430,421 | Gage | Nov. 4, 1947 |
| 2,455,713 | Voorhies | Dec. 7, 1948 |
| 2,620,356 | Munday | Dec. 2, 1952 |
| 2,716,135 | Winstrom | Aug. 23, 1955 |